(12) United States Patent
Arakawa

(10) Patent No.: US 6,740,899 B2
(45) Date of Patent: May 25, 2004

(54) METHOD AND APPARATUS FOR RECORDING AND READING OUT RADIATION IMAGES

(75) Inventor: Satoshi Arakawa, Kaisei-machi (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 229 days.

(21) Appl. No.: 09/943,353

(22) Filed: Aug. 31, 2001

(65) Prior Publication Data
US 2002/0024031 A1 Feb. 28, 2002

(30) Foreign Application Priority Data
Aug. 31, 2000 (JP) .......... 2000-263898

(51) Int. Cl.7 ............................................. G03B 42/08
(52) U.S. Cl. ....................................................... 250/588
(58) Field of Search .......................................... 250/588

(56) References Cited

U.S. PATENT DOCUMENTS

| | | |
|---|---|---|
| 4,543,479 A | 9/1985 | Kato |
| 4,767,927 A * | 8/1988 | Ohyama et al. ............ 250/585 |
| 4,816,679 A | 3/1989 | Sunagawa et al. |
| 4,851,679 A | 7/1989 | Tamura et al. |
| 4,922,103 A | 5/1990 | Kawajiri et al. |
| 4,943,724 A * | 7/1990 | Saotome et al. ............ 250/582 |
| 5,099,119 A * | 3/1992 | Horikawa .................... 250/589 |
| 5,113,078 A * | 5/1992 | Takashi et al. .......... 250/515.1 |

FOREIGN PATENT DOCUMENTS

| | | | |
|---|---|---|---|
| JP | 60-111568 | 6/1985 | ............ H04N/1/04 |
| JP | 60-236354 | 11/1985 | ............ H04N/1/04 |
| JP | 1-101540 | 4/1989 | ........... G03B/42/02 |
| JP | 3-238441 | 10/1991 | ........... G03B/42/02 |

OTHER PUBLICATIONS

Patent Abstract of Japan 03–238441 Oct. 24, 1991.
Patent Abstract of Japan 01–101540 Apr. 19, 1989.

* cited by examiner

Primary Examiner—Constantine Hannaher
(74) Attorney, Agent, or Firm—Sughrue Mion, PLLC

(57) ABSTRACT

One surface of a stimulable phosphor sheet supported at a position for image recording is exposed to radiation. A radiation image having thus been stored on the sheet is read out. Energy remaining on the sheet is released by irradiating erasing light to an entire area of the sheet with an erasing light source located on a side of the other surface of the sheet supported at the position for image recording, which other surface is opposite to the one surface of the sheet exposed to the radiation. A filter having transmitting properties with respect to the erasing light and good absorbing properties with respect to the radiation is located on a side of the erasing light source, which side stands facing the sheet.

12 Claims, 3 Drawing Sheets

METHOD AND APPARATUS FOR RECORDING AND READING OUT RADIATION IMAGES

BACKGROUND OF THE INVENTION

1. Field of the Invention

This invention relates to a radiation image recording and read-out method and apparatus, wherein a radiation image is stored on a stimulable phosphor sheet, the stimulable phosphor sheet, on which the radiation image has been stored, is exposed to stimulating rays, which cause the stimulable phosphor sheet to emit light in proportion to the amount of energy stored thereon during its exposure to radiation, the emitted light is detected, and the radiation image is thereby read out from the stimulable phosphor sheet and converted into an electric signal. This invention particularly relates to an improvement in an erasing light source.

2. Description of the Related Art

It has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause the stimulable phosphor sheet to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material. The radiation image recording and reproducing systems described above are referred to as computed radiography (CR).

The applicant proposed built-in types of radiation image recording and read-out apparatuses, comprising: (i) circulation and conveyance means for conveying at least one stimulable phosphor sheet along a circulation path, (ii) an image recording section, which is located in the circulation path and in which a radiation image of an object is stored on the stimulable phosphor sheet, (iii) an image read-out section, which is located in the circulation path and in which the radiation image is readout from the stimulable phosphor sheet, and (iv) an erasing section, which is located in the circulation path and in which energy remaining on the stimulable phosphor sheet after the radiation image has been read out therefrom is released. The built-in types of radiation image recording and read-out apparatuses are disclosed in, for example, U.S. Pat. Nos. 4,543,479 and 4,851,679, and Japanese Unexamined Patent Publication No. 3(1991)-238441. With the proposed built-in types of radiation image recording and read-out apparatuses, the stimulable phosphor sheet is utilized repeatedly and is processed efficiently.

As for the radiation image recording and read-out apparatuses described above, from the point of view of keeping the emitted light detection time short, reducing the size of the apparatus, and keeping the cost low, it has been proposed to utilize a line sensor comprising a charge coupled device (CCD) image sensor, or the like, as photoelectric read-out means. The utilization of the line sensor as the photoelectric read-out means is disclosed in, for example, Japanese Unexamined Patent Publication Nos. 60(1985)-111568, 60(1985)-236354, and 1(1989)-101540.

Basically, the radiation image recording and read-out apparatuses of such types comprise:

i) a read-out unit comprising (a) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, and (b) a line sensor, which comprises a plurality of photoelectric conversion devices arrayed along the linear area of the stimulable phosphor sheet exposed to the linear stimulating rays, and ii) sub-scanning means for moving the stimulable phosphor sheet with respect to the read-out unit and in a direction (a sub-scanning direction), which is approximately normal to a length direction of the linear area of the stimulable phosphor sheet exposed to the linear stimulating rays (a main scanning direction).

In particular, in cases where the radiation image recording and read-out apparatuses are constituted such that the stimulable phosphor sheet is kept stationary, and the read-out unit is moved in the sub-scanning direction, the sizes of the radiation image recording and read-out apparatuses as a whole are capable of being kept small. As an example of the radiation image recording and read-out apparatus having the constitution described above, in order for energy, which remains on the stimulable phosphor sheet after the radiation image has been read out from the stimulable phosphor sheet, to be released, there has heretofore been proposed a radiation image recording and read-out apparatus, wherein an erasing light source is located on the side backward from the read-out unit, and erasing light is irradiated simultaneously to the entire surface of the stimulable phosphor sheet.

However, problems with regard to back scattering are encountered in that, when radiation, such as X-rays, carrying image information of an object is irradiated to the stimulable phosphor sheet, part of the radiation passes through the stimulable phosphor sheet and is scattered within the radiation image recording and read-out apparatus toward the stimulable phosphor sheet. As a result of the back scattering, information different from the image information of the object is stored as an artifact on the stimulable phosphor sheet, and the image quality of the radiation image becomes bad. For example, in cases where the erasing light source is located on the side backward from the read-out unit in the manner described above, the problems often occur in that the radiation having been scattered by the erasing light source impinges upon the stimulable phosphor sheet, and gray level image pattern corresponding to the form of the erasing light source is recorded on the stimulable phosphor sheet.

In order for the problems described above to be eliminated, it may be considered to employ a technique, wherein a lead plate is located on the side of a surface of the stimulable phosphor sheet, which surface is opposite to the surface of the stimulable phosphor sheet exposed to the radiation, and the radiation having passed through the stimulable phosphor sheet is absorbed by the lead plate, such that the radiation having passed through the stimulable phosphor sheet does not any more enter into the radiation image recording and read-out apparatus. However, it is necessary that, after the radiation image has been stored on the stimulable phosphor sheet, the stimulable phosphor sheet and the read-out unit are located in close vicinity to each other, and an operation for reading out the radiation image from the stimulable phosphor sheet is performed in this state. If the lead plate is located on the side of the surface of the stimulable phosphor sheet, which surface is opposite to the surface of the stimulable phosphor sheet exposed to the radiation, it will not always possible for the stimulable phosphor sheet and the read-out unit to be located in close vicinity to each other for the radiation image read-out operation. Therefore, in such cases, the size of the radiation image recording and read-out apparatus cannot be kept small, and the structure of the radiation image recording and read-out apparatus cannot be kept simple.

SUMMARY OF THE INVENTION

The primary object of the present invention is to provide a radiation image recording and read-out method, wherein radiation having passed through a stimulable phosphor sheet is prevented from being scattered and again impinging upon the stimulable phosphor sheet, such that a size of an apparatus for carrying out the radiation image recording and read-out method is capable of being kept small, and such that a structure of the apparatus is capable of being kept simple.

Another object of the present invention is to provide an apparatus for carrying out the radiation image recording and read-out method.

The present invention provides a radiation image recording and read-out method, comprising the steps of:

i) supporting a stimulable phosphor sheet at a position for image recording, at which one surface of the stimulable phosphor sheet is exposed to radiation, ii) exposing the one surface of the stimulable phosphor sheet, which is supported at the position for image recording, to the radiation, a radiation image being thereby stored on the stimulable phosphor sheet, iii) performing an image read-out operation by irradiating stimulating rays in two-dimensional directions to the stimulable phosphor sheet, on which the radiation image has been stored during its exposure to the radiation, the stimulating rays causing the stimulable phosphor sheet to emit light in proportion to an amount of energy stored thereon during its exposure to the radiation, and photoelectrically detecting the emitted light, an image signal, which represents the radiation image having been stored on the stimulable phosphor sheet, being thereby obtained, and iv) releasing energy, which remains on the stimulable phosphor sheet after the image signal has been obtained from the stimulable phosphor sheet, by irradiating erasing light to an entire area of the stimulable phosphor sheet with an erasing light source, the erasing light source being located on a side of the other surface of the stimulable phosphor sheet supported at the position for image recording, which other surface is opposite to the one surface of the stimulable phosphor sheet exposed to the radiation, wherein a filter, which has transmitting properties with respect to the erasing light and has good absorbing properties with respect to the radiation, is located on a side of the erasing light source, which side stands facing the stimulable phosphor sheet.

The irradiation of the stimulating rays in two-dimensional directions to the stimulable phosphor sheet, on which the radiation image has been stored, may be performed in one of various ways. For example, one light beam of the stimulating rays may be deflected in the main scanning direction and the sub-scanning direction, and the stimulable phosphor sheet may be scanned with the light spot of the light beam in two-dimensional directions. Alternatively, one light beam of the stimulating rays may be deflected in the main scanning direction alone and may be moved with respect to the stimulable phosphor sheet in the sub-scanning direction. As another alternative, the stimulating rays may be irradiated linearly to an area on the stimulable phosphor sheet along the main scanning direction, the linear stimulating rays may be moved in the sub-scanning direction, and the stimulable phosphor sheet may thereby be scanned with the stimulating rays in two-dimensional directions. As a further alternative, the stimulating rays may be irradiated simultaneously to the entire area of the stimulable phosphor sheet.

In order for the erasing light to be irradiated to the entire area of the stimulable phosphor sheet, the erasing light may be irradiated simultaneously to the entire area of the stimulable phosphor sheet. Alternatively, the erasing light source maybe moved with respect to the stimulable phosphor sheet, and the erasing light may thereby be irradiated to the entire area of the stimulable phosphor sheet.

In the radiation image recording and read-out method in accordance with the present invention, the filter should preferably be a filter, which transmits only light constituted of light components having wavelengths longer than wavelengths of an ultraviolet region. Also, the filter should preferably be constituted of a material selected from the group consisting of a plastic material, which contains a heavy metal (such as Pb, Bi, or W), and a glass, which contains a heavy metal (such as Pb, Bi, or W).

Further, in the radiation image recording and read-out method in accordance with the present invention, the stimulable phosphor sheet may be kept stationary at the position for image recording, and the image read-out operation (i.e., the irradiation of the stimulating rays to the stimulable phosphor sheet and the detection of the light emitted by the stimulable phosphor sheet) may thereby be performed. Alternatively, after the radiation image has been recorded on the stimulable phosphor sheet, the stimulable phosphor sheet, on which the radiation image has been stored, may be conveyed by conveyance means to an image read-out section, and the image read-out operation may be performed in the image read-out section. In particular, the radiation image recording and read-out method in accordance with the present invention should preferably be modified such that the stimulable phosphor sheet is kept stationary at the position for image recording, and the image read-out operation is performed with image read-out means, which is located between the stimulable phosphor sheet and the erasing light source.

In such cases, the radiation image recording and read-out method in accordance with the present invention should preferably be modified such that the image read-out means comprises:

a) a read-out unit for irradiating the stimulating rays to the stimulable phosphor sheet in a one-dimensional direction along a main scanning direction and detecting the light, which is emitted by the stimulable phosphor sheet when the stimulating rays are irradiated to the stimulable phosphor sheet in the one-dimensional direction, and b) unit moving means for moving the read-out unit in a sub-scanning direction.

The sub-scanning direction is the direction intersecting with the main scanning direction. In cases where the read-out unit irradiates the stimulating rays to the stimulable phosphor sheet in the one-dimensional direction along the main scanning direction and is moved in the sub-scanning direction, the stimulating rays are irradiated to the stimulable phosphor sheet in two-dimensional directions.

Ordinarily, the sub-scanning direction is normal to the main scanning direction.

The read-out unit should preferably comprise a linear stimulating ray source, which linearly irradiates the stimulating rays to an area of the stimulable phosphor sheet, and a line sensor, which is located along the linear area of the stimulable phosphor sheet exposed to the linear stimulating rays and photoelectrically detects the light emitted by the stimulable phosphor sheet when the stimulating rays are irradiated to the stimulable phosphor sheet.

The present invention also provides an apparatus for carrying out the radiation image recording and read-out method in accordance with the present invention. Specifically, the present invention also provides a radiation image recording and read-out apparatus, comprising:

i) an image recording section for supporting a stimulable phosphor sheet at a position for image recording, at which one surface of the stimulable phosphor sheet is exposed to radiation, ii) image read-out means for performing an image read-out operation by irradiating stimulating rays in two-dimensional directions to the stimulable phosphor sheet, on which a radiation image has been stored during its exposure to the radiation in the image recording section, the stimulating rays causing the stimulable phosphor sheet to emit light in proportion to an amount of energy stored thereon during its exposure to the radiation, and photoelectrically detecting the emitted light, an image signal, which represents the radiation image having been stored on the stimulable phosphor sheet, being thereby obtained, and iii) an erasing light source located on a side of the other surface of the stimulable phosphor sheet supported at the position for image recording, which other surface is opposite to the one surface of the stimulable phosphor sheet exposed to the radiation, the erasing light source releasing energy, which remains on the stimulable phosphor sheet after the image signal has been obtained from the stimulable phosphor sheet, by irradiating erasing light to an entire area of the stimulable phosphor sheet, wherein a filter, which has transmitting properties with respect to the erasing light and has good absorbing properties with respect to the radiation, is located on a side of the erasing light source, which side stands facing the stimulable phosphor sheet.

In the radiation image recording and read-out apparatus in accordance with the present invention, the filter should preferably be a filter, which transmits only light constituted of light components having wavelengths longer than wavelengths of an ultraviolet region. Also, the filter should preferably be constituted of a material selected from the group consisting of a plastic material, which contains a heavy metal (such as Pb, Bi, or W), and a glass, which contains a heavy metal (such as Pb, Bi, or W).

Further, in the radiation image recording and read-out apparatus in accordance with the present invention, the stimulable phosphor sheet may be kept stationary at the position for image recording, and the image read-out operation (i.e., the irradiation of the stimulating rays to the stimulable phosphor sheet and the detection of the light emitted by the stimulable phosphor sheet) may thereby be performed. Alternatively, after the radiation image has been recorded on the stimulable phosphor sheet, the stimulable phosphor sheet, on which the radiation image has been stored, may be conveyed by conveyance means to an image read-out section, and the image read-out operation may be performed in the image read-out section. In particular, the radiation image recording and read-out apparatus in accordance with the present invention should preferably be modified such that the stimulable phosphor sheet is kept stationary at the position for image recording, and the image read-out means is located between the stimulable phosphor sheet and the erasing light source.

In such cases, the radiation image recording and read-out apparatus in accordance with the present invention should preferably be modified such that the image read-out means comprises:

a) a read-out unit for irradiating the stimulating rays to the stimulable phosphor sheet in a one-dimensional direction along a main scanning direction and detecting the light, which is emitted by the stimulable phosphor sheet when the stimulating rays are irradiated to the stimulable phosphor sheet in the one-dimensional direction, and b) unit moving means for moving the read-out unit in a sub-scanning direction.

The read-out unit should preferably comprise a linear stimulating ray source, which linearly irradiates the stimulating rays to an area of the stimulable phosphor sheet, and a line sensor, which is located along the linear area of the stimulable phosphor sheet exposed to the linear stimulating rays and photoelectrically detects the light emitted by the stimulable phosphor sheet when the stimulating rays are irradiated to the stimulable phosphor sheet.

With the radiation image recording and read-out method and apparatus in accordance with the present invention, the erasing light source for releasing energy, which remains on the stimulable phosphor sheet after the image signal has been obtained from the stimulable phosphor sheet, is located on the side of the other surface of the stimulable phosphor sheet supported at the position for image recording, which other surface is opposite to the one surface of the stimulable phosphor sheet exposed to the radiation. Also, the filter, which has transmitting properties with respect to the erasing light and has good absorbing properties with respect to the radiation, is located on the side of the erasing light source, which side stands facing the stimulable phosphor sheet. Therefore, back scattering of the radiation is capable of being prevented from occurring. Also, the size of the radiation image recording and read-out apparatus as a whole is capable of being kept smaller than the cases where a lead plate for absorbing the radiation is provided. Further, the structure of the radiation image recording and read-out apparatus is capable of being kept simpler than the cases where the lead plate for absorbing the radiation is provided.

With the radiation image recording and read-out method and apparatus, wherein the filter is a filter, which transmits only light constituted of light components having wavelengths longer than wavelengths of the ultraviolet region, the problems are capable of being prevented from occurring in that new trapped electrons are formed on the stimulable phosphor sheet, i.e. new energy is stored on the stimulable phosphor sheet, due to light components of the erasing light, which light components have wavelengths shorter than the wavelengths of the ultraviolet region. Therefore, the erasing efficiency is capable of being enhanced.

With the radiation image recording and read-out method and apparatus in accordance with the present invention, the stimulable phosphor sheet may be kept stationary at the position for image recording, and the image read-out operation may be performed with the image read-out means comprising (a) the read-out unit for irradiating the stimulating rays to the stimulable phosphor sheet in the one-dimensional direction along the main scanning direction and detecting the light, which is emitted by the stimulable phosphor sheet when the stimulating rays are irradiated to the stimulable phosphor sheet in the one-dimensional direction, and (b) the unit moving means for moving the read-out unit in the sub-scanning direction. In such cases, a space for the conveyance of the stimulable phosphor sheet and conveyance means are not necessary. Therefore, the size of the radiation image recording and read-out apparatus as a whole is capable of being minimized.

Further, the read-out unit may comprise the linear stimulating ray source, which linearly irradiates the stimulating rays to the area of the stimulable phosphor sheet, and the line sensor, which is located along the linear area of the stimulable phosphor sheet exposed to the linear stimulating rays and photoelectrically detects the light emitted by the stimulable phosphor sheet when the stimulating rays are irradiated to the stimulable phosphor sheet. The linear stimulating ray source is capable of being formed to a size smaller than a point scanning type of light source, with which one light beam is deflected and caused to scan on the stimulable phosphor sheet. Also, the line sensor is smaller than a photomultiplier, or the like. Therefore, in such cases, the size of the read-out unit as a whole is capable of being set to be small, and the size of the radiation image recording and read-out apparatus as a whole is consequently capable of being set to be small.

DESCRIPTION OF THE PREFERRED EMBODIMENTS

The present invention will hereinbelow be described in further detail with reference to the accompanying drawings.

Figure 1:
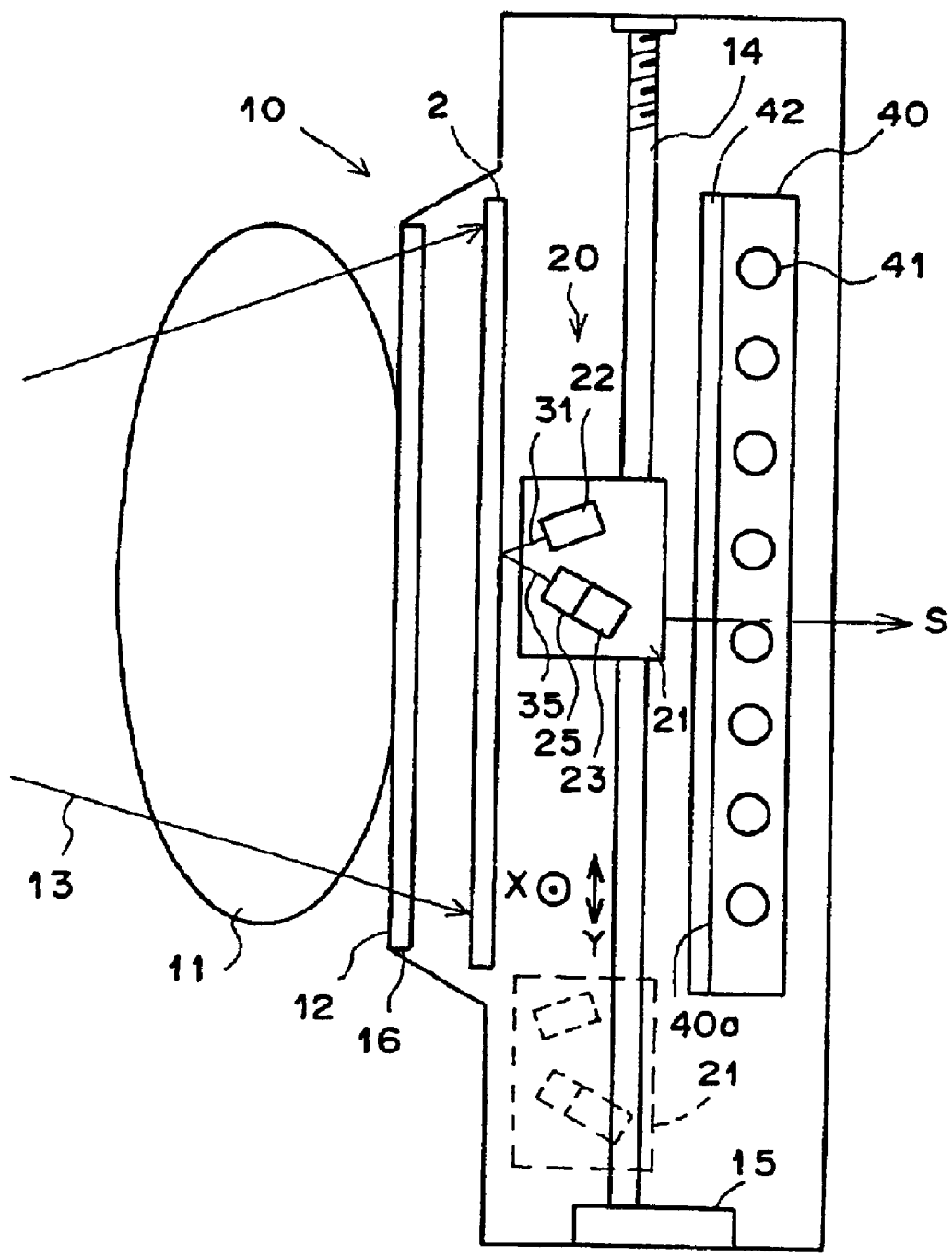
FIG. 1 is a schematic side view showing an embodiment of the radiation image recording and read-out apparatus in accordance with the present invention.

FIG. 1 is a schematic side view showing an embodiment of the radiation image recording and read-out apparatus in accordance with the present invention. As illustrated in FIG. 1, the radiation image recording and read-out apparatus comprises a radiation image recording section 10, a radiation image read-out section 20, and an erasing light source 40.

The radiation image recording section 10 is provided with an object support base 12 for supporting an object 11, such as a human body, at a predetermined position. A grid 16 for removing scattered radiation is located on the side rearward from the object support base 12. Also, a stimulable phosphor sheet 2 is supported at a predetermined position for image recording and on the side rearward from the grid 16. The object support base 12 has permeability to radiation.

In the radiation image read-out section 20, a radiation image is read out with a read-out unit 21 from the stimulable phosphor sheet 2, on which the radiation image has been stored. The read-out unit 21 comprises a line light source (linear stimulating ray source) 22, a CCD line sensor 23, and a light collecting lens array 25, which is located on the side forward from the CCD line sensor 23 so as to stand facing the stimulable phosphor sheet 2. The read-out unit 21 is provided with a female thread region (not shown) for engagement with a ball screw 14, which extends vertically and is rotated by movement means 15. When the ball screw 14 is rotated forwardly and reversely, the read-out unit 21 is moved upwardly and downwardly by the ball screw 14.

Figure 2:
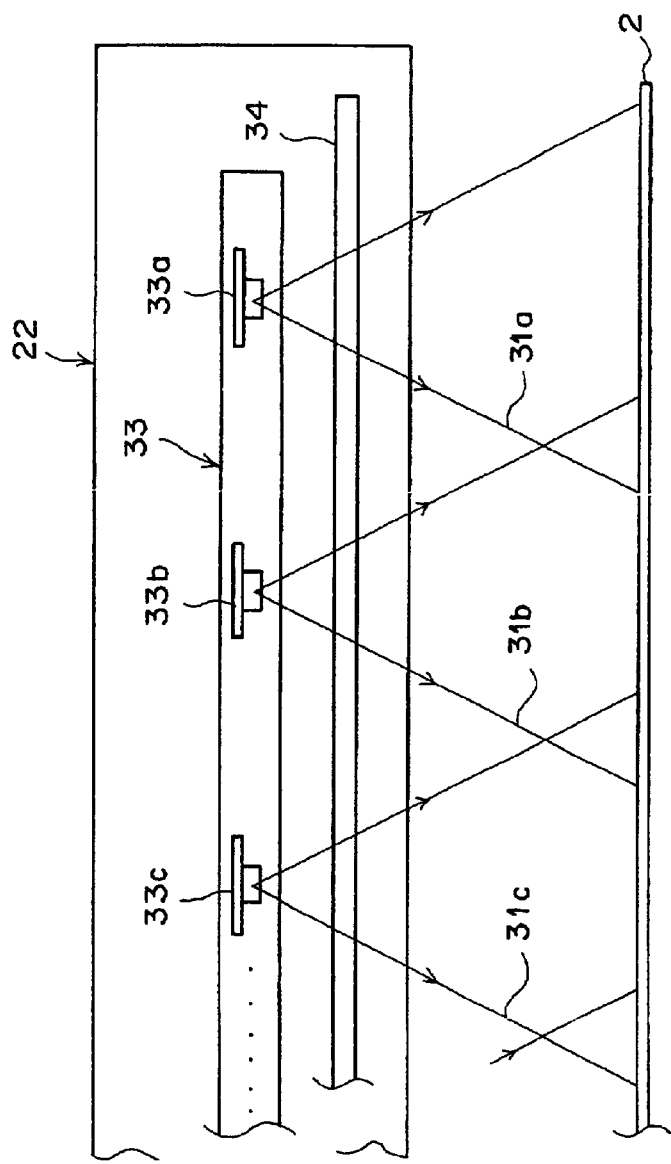
FIG. 2 is a front view showing a line light source employed in the embodiment of FIG. 1.

FIG. 2 is a front view showing the line light source 22. As illustrated in FIG. 2, the line light source 22 comprises a laser diode array 33 and a cylindrical lens 34. The laser diode array 33 comprises a plurality of laser diodes 33$a$, 33$b$, 33$c$, . . . arrayed in a line. By way of example, each of the laser diodes 33$a$, 33$b$, 33$c$, . . . produces a laser beam (the stimulating rays) having wavelengths falling within the range of 650 nm to 690 nm. The laser diodes 33$a$, 33$b$, 33$c$, . . . respectively produce stimulating rays 31$a$, 31$b$, 31$c$, . . . in a divergent light state. The stimulating rays 31$a$, 31$b$, 31$c$, . . . , which have been produced by the laser diodes 33$a$, 33$b$, 33$c$, . . . , are converged by the cylindrical lens 34 with respect to only one direction (only in the plane of the sheet of FIG. 1) and into fan beams. The stimulating rays 31, which are composed of the fan beams standing in a row, are linearly irradiated onto the linear area of the stimulable phosphor sheet 2.

Figure 3:
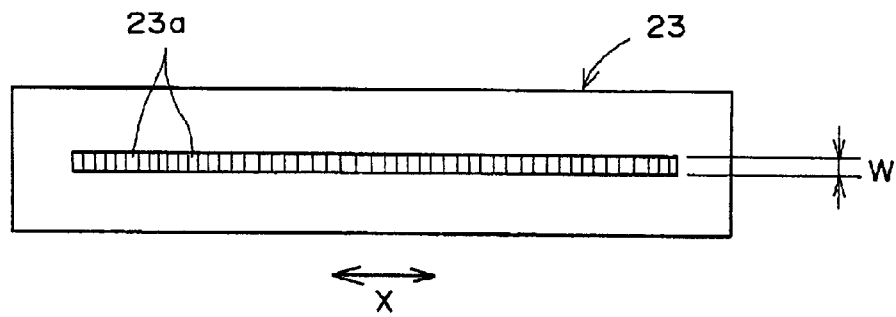
FIG. 3 is a plan view showing a line sensor employed in the embodiment of FIG. 1.

FIG. 3 is a plan view showing the CCD line sensor 23. As illustrated in FIG. 3, the CCD line sensor 23 comprises a plurality of sensor chips (photoelectric conversion devices) 23$a$, 23$a$, . . . , which are arrayed in a line. In this embodiment, a light receiving width of the CCD line sensor 23, which light receiving width is taken in the direction normal to the array direction of the sensor chips 23$a$, 23$a$, . . . , i.e. a width W of each of the sensor chips 23$a$, 23$a$, . . . , is approximately equal to 100 $\mu$m.

The CCD line sensor 23 is located in an orientation such that the sensor chips 23$a$, 23$a$, . . . stand side by side along a length direction of the linear area of the stimulable phosphor sheet 2 exposed to the linear stimulating rays 31 in FIG. 1 (i.e., along the main scanning direction indicated by the arrow X in FIG. 1). In cases where the stimulable phosphor sheet 2 has a large width, the CCD line sensor 23 may be composed of a plurality of line sensors, which are arrayed so as to stand in a row along the length direction of the CCD line sensor 23.

Figure 4:
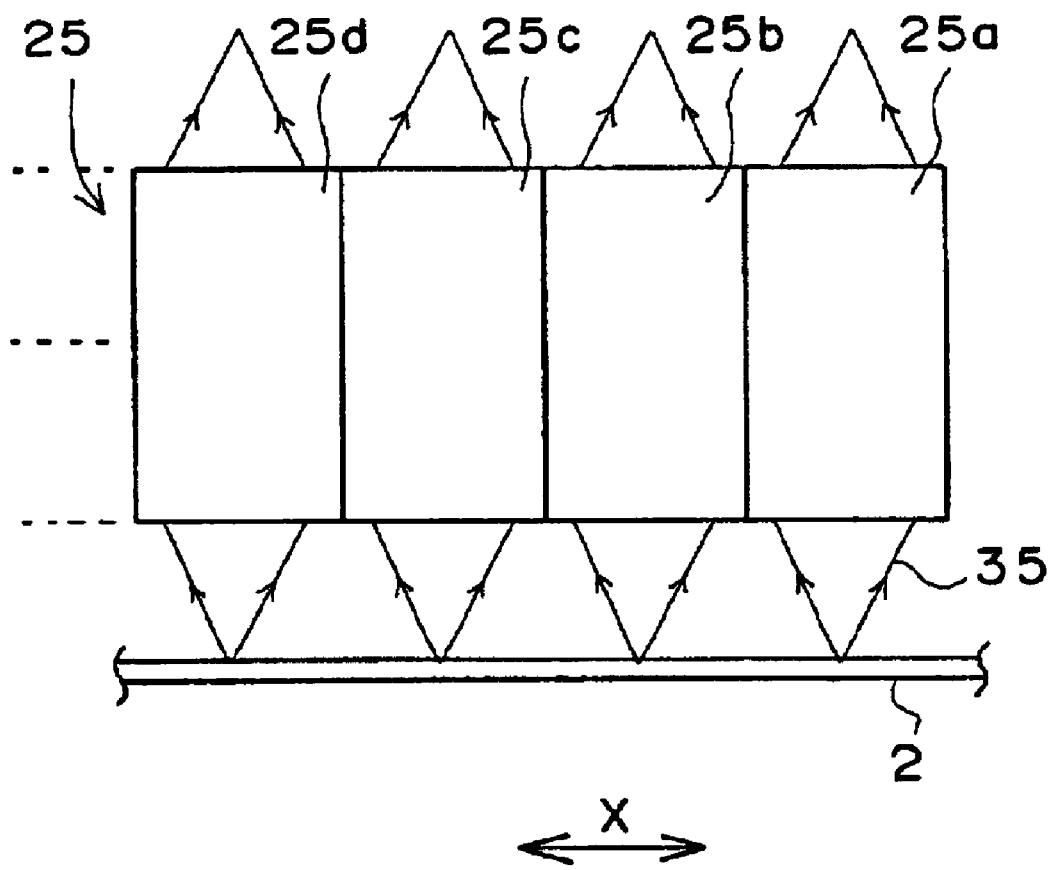
FIG. 4 is a front view showing a light collecting lens array employed in the embodiment of FIG. 1.

FIG. 4 is a front view showing the light collecting lens array 25, which is located on the side forward from the CCD line sensor 23. As illustrated in FIG. 4, the light collecting lens array 25 comprises, for example, a plurality of distributed index lenses 25$a$, 25$b$, 25$c$, 25$d$, . . . , which are arrayed in a line. The light collecting lens array 25 is located in an orientation such that the distributed index lenses 25$a$, 25$b$, 25$c$, 25$d$, . . . stand side by side along the length direction of the linear area of the stimulable phosphor sheet 2 exposed to the linear stimulating rays 31, i.e. along the main scanning direction indicated by the arrow X in FIG. 1. Each of the distributed index lenses 25$a$, 25$b$, 25$c$, 25$d$, . . . collects light 35, which is emitted by the stimulable phosphor sheet 2. Also, as illustrated in FIG. 1, each of the distributed index lenses 25$a$, 25$b$, 25$c$, 25$d$, . . . guides the emitted light 35 toward the CCD line sensor 23.

Though not shown, a filter for filtering out the stimulating rays 31, which have been reflected from the stimulable phosphor sheet 2, is located between the CCD line sensor 23 and the light collecting lens array 25.

The erasing light source 40 is located on the side backward from the radiation image read-out section 20. After the radiation image has been read out from the stimulable phosphor sheet 2 in the radiation image read-out section 20, the erasing light source 40 releases energy, which remains on the stimulable phosphor sheet 2, by irradiating erasing light to the stimulable phosphor sheet 2. The erased stimulable phosphor sheet 2 can then be used for recording a next radiation image. The erasing light source 40 comprises a plurality of fluorescent lamps 41, 41, which stand side by side with respect to the direction indicated by the arrow Y in FIG. 1. Each of the fluorescent lamps 41, 41, . . . has a length equal to the width of the stimulable phosphor sheet 2, which length is taken in the direction indicated by the arrow X in FIG. 1. The erasing light is radiated out from a surface 40a of the erasing light source 40. A heavy metal-containing filter 42 is located on the entire area of the surface 40a of the erasing light source 40. The size of the surface 40a, from which the erasing light is radiated out, is at least identical with the size of the stimulable phosphor sheet 2, and the surface 40a is located so as to stand facing the stimulable phosphor sheet 2. Therefore, the erasing light, which has been produced by the erasing light source 40, is simultaneously irradiated to the entire area of the stimulable phosphor sheet 2.

As the heavy metal-containing filter 42, a lead-containing acrylic resin, a lead glass, or the like, is employed. The heavy metal-containing filter 42 is capable of transmitting the erasing light and absorbing the radiation 13.

Therefore, in the operation for recording the radiation image on the stimulable phosphor sheet 2, the heavy metal-containing filter 42 absorbs the radiation 13, which has passed through the stimulable phosphor sheet 2, and suppresses back scattering of the radiation 13. Accordingly, the problems are capable of being prevented from occurring in that a fog, an artifact, or the like, occurs due to the back scattering of the radiation 13.

Also, the heavy metal-containing filter 42 has the functions for filtering out light components having wavelengths shorter than the wavelengths of the ultraviolet region. Therefore, the problems are capable of being prevented from occurring in that new energy is stored on the stimulable phosphor sheet 2 due to the light components of the erasing light, which light components have wavelengths shorter than the wavelengths of the ultraviolet region. Accordingly, the erasing efficiency is capable of being enhanced.

How the aforesaid embodiment of the radiation image read-out apparatus in accordance with the present invention operates will be described hereinbelow.

When an operation for recording the radiation image of the object 11 on the stimulable phosphor sheet 2 is to be performed, the object 11 lies at the aforesaid predetermined position on the object support base 12. The radiation 13, such as X-rays, is then produced by a radiation source (not shown) and irradiated to the object 11. The radiation 13 carrying image information of the object 11 impinges upon the stimulable phosphor sheet 2. In this manner, the radiation image of the object 11 is recorded (i.e., stored) on the stimulable phosphor sheet 2.

At the time at which the image recording operation for recording the radiation image of the object 11 on the stimulable phosphor sheet 2 is performed, the read-out unit 21 is set at the waiting position indicated by the broken lines in FIG. 1. When the image recording operation has been finished, the read-out unit 21 is moved upwardly at a predetermined speed. At this time, the laser diode array 33 of the line light source 22 is activated to produce the stimulating rays 31, and the fan beam-like stimulating rays 31 are linearly irradiated to the linear area of the stimulable phosphor sheet 2, which linear area extends in the main scanning direction indicated by the arrow X. Also, the read-out unit 21 is moved in the sub-scanning direction indicated by the arrow Y, which sub-scanning direction is normal to the main scanning direction indicated by the arrow X. As a result, the stimulable phosphor sheet 2 is scanned with the stimulating rays 31 in two-dimensional directions.

When the stimulating rays 31 are linearly irradiated to the area of the stimulable phosphor sheet 2, the linear area of the stimulable phosphor sheet 2 exposed to the linear stimulating rays 31 emits the light 35 having intensity in accordance with the radiation image having been stored on the stimulable phosphor sheet 2. The emitted light 35 is collected by the light collecting lens array 25, impinges upon the CCD line sensor 23, and is received by the CCD line sensor 23.

The CCD line sensor 23 photoelectrically detects the emitted light 35 and feeds out a light detection signal. The light detection signal is fed into a read-out circuit (not shown) and subjected to amplification and analog-to-digital conversion. A read-out image signal S, which has thus been obtained, is fed out from the radiation image recording and read-out apparatus. When necessary, the read-out image signal S is subjected to processing, such as gradation processing and processing in the frequency domain. The read-out image signal S is then fed into image displaying means, such as a CRT display device, or an image recording apparatus, such as a light scanning recording apparatus, and is utilized for reproducing the image represented by the read-out image signal S, i.e. the radiation image having been stored on the stimulable phosphor sheet 2.

When the read-out unit 21 is moved to a sub-scanning end position and the image read-out operation is finished, the read-out unit 21 is moved downwardly toward the waiting position described above.

Thereafter, the erasing light source 40 is activated to produce the erasing light. The erasing light, which has been produced by the erasing light source 40, is irradiated uniformly to the entire area of the stimulable phosphor sheet 2. When the stimulable phosphor sheet 2 is exposed to the erasing light having wavelengths falling within the stimulation wavelength region for the stimulable phosphor sheet 2, energy remaining on a stimulable phosphor layer of the stimulable phosphor sheet 2 is released. Therefore, the stimulable phosphor sheet 2 is capable of being again utilized for the recording of a radiation image.

After the read-out unit 21 has been returned to the waiting position described above, the radiation 13 carrying the image information of the object 11 may be irradiated to the stimulable phosphor sheet 2. In this manner, the radiation image of the object 11 is capable of being stored on the stimulable phosphor sheet 2.

The erasing light source 40 need not necessarily be constituted such that the erasing light is simultaneously irradiated to the entire area of the stimulable phosphor sheet 2. For example, the erasing light source 40 may be replaced by an erasing light source having the width identical with the width of the stimulable phosphor sheet 2, which width is taken in the direction indicated by the arrow X in FIG. 1, and having a length shorter than the length of the stimulable phosphor sheet 2, which length is taken in the direction indicated by the arrow Y. The erasing light source may be moved in the direction indicated by the arrow Y, and the erasing light may thereby be irradiated successively to the entire area of the stimulable phosphor sheet 2.

In lieu of the laser diode array 33, the line light source 22 may comprise a light emitting diode (LED) array.

In the embodiment described above, the stimulable phosphor sheet 2 is kept stationary at the position for image recording, and the radiation image is read out from the stimulable phosphor sheet 2 while the stimulable phosphor sheet 2 is being kept in this state. Alternatively, after the radiation image has been recorded on the stimulable phosphor sheet 2 at the position for image recording, the stimulable phosphor sheet 2 may be moved to a predetermined position for image readout, and the radiation image may be read out from the stimulable phosphor sheet 2 at the position for image readout.

Also, in the embodiment described above, the radiation image read-out section 20 is provided with the read-out unit 21, which comprises the line light source 22 and the CCD line sensor 23. Alternatively, a read-out unit may be employed, which comprises point scanning means and photoelectric conversion means constituted of a photomultiplier sensor.

In the aforesaid embodiment of the radiation image read-out apparatus in accordance with the present invention, the stimulable phosphor sheet for storing the radiation image may be an ordinary stimulable phosphor sheet having both the functions for absorbing radiation and the functions for storing energy from the radiation. Alternatively, the stimulable phosphor sheet may be a stimulable phosphor sheet proposed in, for example, Japanese Patent Application No. 11(1999)-372978. Such that the functions for absorbing radiation and the functions for storing energy from the radiation may be separated from each other, the proposed stimulable phosphor sheet contains a layer of a phosphor for radiation absorption, which is capable of absorbing radiation and being caused to emit light having wavelengths falling within an ultraviolet to visible region, and a layer of a stimulable phosphor for energy storage, which is capable of absorbing light having wavelengths falling within the ultraviolet to visible region and thereby storing energy of the light having wavelengths falling within the ultraviolet to visible region, and which is capable of being stimulated by light having wavelengths falling within a visible to infrared region and thereby radiating out the stored energy as emitted light. As another alternative, the stimulable phosphor sheet may be one of various other kinds of stimulable phosphor sheets.

What is claimed is:

1. A radiation image recording and read-out method, comprising the steps of:
   i) supporting a stimulable phosphor sheet at a position for image recording, at which one surface of the stimulable phosphor sheet is exposed to radiation,
   ii) exposing the one surface of the stimulable phosphor sheet, which is supported at the position for image recording, to the radiation, a radiation image being thereby stored on the stimulable phosphor sheet,
   iii) performing an image read-out operation by irradiating stimulating rays in two-dimensional directions to the stimulable phosphor sheet, on which the radiation image has been stored during its exposure to the radiation, the stimulating rays causing the stimulable phosphor sheet to emit light in proportion to an amount of energy stored thereon during its exposure to the radiation, and photoelectrically detecting the emitted light, an image signal, which represents the radiation image having been stored on the stimulable phosphor sheet, being thereby obtained, and
   iv) releasing energy, which remains on the stimulable phosphor sheet after the image signal has been obtained from the stimulable phosphor sheet, by irradiating erasing light to an entire area of the stimulable phosphor sheet with an erasing light source, the erasing light source being located on a side of the other surface of the stimulable phosphor sheet supported at the position for image recording, which other surface is opposite to the one surface of the stimulable phosphor sheet exposed to the radiation,
   wherein a filter, which has transmitting properties with respect to the erasing light and has good absorbing properties with respect to the radiation, is located on a side of the erasing light source, which side stands facing the stimulable phosphor sheet.

2. A method as defined in claim 1 wherein the filter is a filter, which transmits only light constituted of light components having wavelengths longer than wavelengths of an ultraviolet region.

3. A method as defined in claim 1 or 2 wherein the filter is constituted of a material selected from the group consisting of a plastic material, which contains a heavy metal, and a glass, which contains a heavy metal.

4. A radiation image recording and read-out method comprising the steps of:
   i) supporting a stimulable phosphor sheet at a position for image recording, at which one surface of the stimulable phosphor sheet is exposed to radiation,
   ii) exposing the one surface of the stimulable phosphor sheet, which is supported at the position for image recording, to the radiation, a radiation image being thereby stored on the stimulable phosphor sheet.
   iii) performing an image read-out operation by irradiating stimulating rays in two-dimensional directions to the stimulable phosphor sheet, on which the radiation image has been stored during its exposure to the radiation, the stimulating rays causing the stimulable phosphor sheet to emit light in proportion to an amount of energy stored thereon during its exposure to the radiation, and photoelectrically detecting the emitted light, an image signal, which represents the radiation image having been stored on the stimulable phosphor sheet, being thereby obtained, and
   iv) releasing energy, which remains on the stimulable phosphor sheet after the image signal has been obtained from the stimulable phosphor sheet, by irradiating erasing light to an entire area of the stimulable phosphor sheet with an erasing light source, the erasing light source being located on a side of the other surface of the stimulable phosphor sheet supported at the position for image recording, which other surface is opposite to the one surface of the stimulable phosphor sheet exposed to the radiation,
   wherein a filter, which has transmitting properties with respect to the erasing light and has good absorbing properties with respect to the radiation, is located on a side of the erasing light source, which side stands facing the stimulable phosphor sheet,
   wherein the stimulable phosphor sheet is kept stationary at the position for image recording, and
   the image read-out operation is performed with image read-out means, which is located between the stimulable phosphor sheet and the erasing light source.

5. A method as defined in claim 4 wherein the image read-out means comprises:
   a) a read-out unit for irradiating the stimulating rays to the stimulable phosphor sheet in a one-dimensional direction along a main scanning direction and detecting the light, which is emitted by the stimulable phosphor sheet when the stimulating rays are irradiated to the stimulable phosphor sheet in the one-dimensional direction, and b) unit moving means for moving the read-out unit in a sub-scanning direction.

6. A method as defined in claim 5 wherein the read-out unit comprises a linear stimulating ray source, which linearly irradiates the stimulating rays to an area of the stimulable phosphor sheet, and a line sensor, which is located along the linear area of the stimulable phosphor sheet exposed to the linear stimulating rays and photoelectrically detects the light emitted by the stimulable phosphor sheet when the stimulating rays are irradiated to the stimulable phosphor sheet.

7. A radiation image recording and read-out apparatus, comprising:

i) an image recording section for supporting a stimulable phosphor sheet at a position for image recording, at which one surface of the stimulable phosphor sheet is exposed to radiation, ii) image read-out means for performing an image read-out operation by irradiating stimulating rays in two-dimensional directions to the stimulable phosphor sheet, on which a radiation image has been stored during its exposure to the radiation in the image recording section, the stimulating rays causing the stimulable phosphor sheet to emit light in proportion to an amount of energy stored thereon during its exposure to the radiation, and photoelectrically detecting the emitted light, an image signal, which represents the radiation image having been stored on the stimulable phosphor sheet, being thereby obtained, and iii) an erasing light source located on a side of the other surface of the stimulable phosphor sheet supported at the position for image recording, which other surface is opposite to the one surface of the stimulable phosphor sheet exposed to the radiation, the erasing light source releasing energy, which remains on the stimulable phosphor sheet after the image signal has been obtained from the stimulable phosphor sheet, by irradiating erasing light to an entire area of the stimulable phosphor sheet, wherein a filter, which has transmitting properties with respect to the erasing light and has good absorbing properties with respect to the radiation, is located on a side of the erasing light source, which side stands facing the stimulable phosphor sheet.

8. An apparatus as defined in claim 7 wherein the filter is a filter, which transmits only light constituted of light components having wavelengths longer than wavelengths of an ultraviolet region.

9. An apparatus as defined in claim 7 or 8 wherein the filter is constituted of a material selected from the group consisting of a plastic material, which contains a heavy metal, and a glass, which contains a heavy metal.

10. A radiation image recording and read-out apparatus, comprising:

i) an image recording section for supporting a stimulable phosphor sheet at a position for image recording, at which one surface of the stimulable phosphor sheet is exposed to radiation, ii) image read-out means for performing an image read-out operation by irradiating stimulating rays in two-dimensional directions to the stimulable phosphor sheet, on which a radiation image has been stored during its exposure to the radiation in the image recording section, the stimulating rays causing the stimulable phosphor sheet to emit light in proportion to an amount of energy stored thereon during its exposure to the radiation, and photoelectrically detecting the emitted light, an image signal, which represents the radiation image having been stored on the stimulable phosphor sheet, being thereby obtained, and iii) an erasing light source located on a side of the other surface of the stimulable phosphor sheet supported at the position for image recording, which other surface is opposite to the one surface of the stimulable phosphor sheet exposed to the radiation, the erasing light source releasing energy, which remains on the stimulable phosphor sheet after the image signal has been obtained from the stimulable phosphor sheet, by irradiating erasing light to an entire area of the stimulable phosphor sheet, wherein a filter, which has transmitting properties with respect to the erasing light and has good absorbing properties with respect to the radiation, is located on a side of the erasing light source, which side stands facing the stimulable phosphor sheet, wherein the stimulable phosphor sheet is kept stationary at the position for image recording, and the image read-out means is located between the stimulable phosphor sheet and the erasing light source.

11. An apparatus as defined in claim 10 wherein the image read-out means comprises:

a) a read-out unit for irradiating the stimulating rays to the stimulable phosphor sheet in a one-dimensional direction along a main scanning direction and detecting the light, which is emitted by the stimulable phosphor sheet when the stimulating rays are irradiated to the stimulable phosphor sheet in the one-dimensional direction, and b) unit moving means for moving the read-out unit in a sub-scanning direction.

12. An apparatus as defined in claim 11 wherein the read-out unit comprises a linear stimulating ray source, which linearly irradiates the stimulating rays to an area of the stimulable phosphor sheet, and a line sensor, which is located along the linear area of the stimulable phosphor sheet exposed to the linear stimulating rays and photoelectrically detects the light emitted by the stimulable phosphor sheet when the stimulating rays are irradiated to the stimulable phosphor sheet.

* * * * *